US012649211B2

(12) United States Patent
Schultz et al.

(10) Patent No.: US 12,649,211 B2
(45) Date of Patent: Jun. 9, 2026

(54) FILE BELT SANDER

(71) Applicant: MILWAUKEE ELECTRIC TOOL CORPORATION, Brookfield, WI (US)

(72) Inventors: Kyle W. Schultz, Germantown, WI (US); Trevor L. Paff, Slinger, WI (US); Peter A. Borowski, Milwaukee, WI (US); Andrew R. Palm, Glendale, WI (US); Erik P. Bothe, Pewaukee, WI (US); Kendall O. Teufel, Milwaukee, WI (US); Justin T. Kornely, Milwaukee, WI (US); Steven M. Burakowski, Muskego, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 446 days.

(21) Appl. No.: 18/170,904

(22) Filed: Feb. 17, 2023

(65) Prior Publication Data

US 2023/0264316 A1 Aug. 24, 2023

Related U.S. Application Data

(60) Provisional application No. 63/312,444, filed on Feb. 22, 2022.

(51) Int. Cl.
*B24B 23/06* (2006.01)
*B25F 5/02* (2006.01)

(52) U.S. Cl.
CPC ................ *B24B 23/06* (2013.01); *B25F 5/02* (2013.01)

(58) Field of Classification Search
CPC ......... B24B 21/12; B24B 21/14; B24B 21/18; B24B 21/20; B24B 23/06; B24B 55/057
(Continued)

(56) References Cited

U.S. PATENT DOCUMENTS 3,427,757 A 2/1969 Redman
3,533,192 A 10/1970 Wezel
(Continued)

FOREIGN PATENT DOCUMENTS

CN 2032924 U 2/1989
CN 1291814 C 12/2006
(Continued)

OTHER PUBLICATIONS

Partial European Search Report for Application No. 23157871.7 dated Jul. 10, 2023 (16 pages).
(Continued)

*Primary Examiner* — Katina N. Henson
*Assistant Examiner* — Sharonda T Felton
(74) *Attorney, Agent, or Firm* — Michael Best & Friedrich LLP

(57) ABSTRACT

A belt sander for sanding a workpiece including a main housing, a motor having a motor shaft disposed within the main housing, and a handle extending from the motor housing and configured to be grasped by a user for maneuvering the belt sander. The motor shaft defines a motor axis that is perpendicular to a handle axis of the handle. The belt sander further includes a contact arm that extends from the motor housing and is moveable between a stowed position and a deployed position, and a light assembly coupled to the motor housing. The light assembly includes a light housing, an LED, and a lens coupled to the light housing for diverging light rays from the LED across a light range. When the contact arm is in the deployed position, the light range illuminates at least a portion of the contact arm and a space below the contact arm.

22 Claims, 8 Drawing Sheets

(58) Field of Classification Search
USPC ................ 451/296, 297, 310, 355, 451, 454
See application file for complete search history.

(56) References Cited

U.S. PATENT DOCUMENTS

| | | | |
|---|---|---|---|
| 3,594,959 A | 7/1971 | Wezel | |
| 3,611,646 A | 10/1971 | Cameron et al. | |
| 3,619,949 A | 11/1971 | Welsch et al. | |
| 3,643,385 A | 2/1972 | Mikiya | |
| 3,653,274 A | 4/1972 | Greendwood | |
| 3,713,255 A | 1/1973 | Welsch | |
| 3,823,513 A | 7/1974 | Welsch | |
| 4,195,449 A | 4/1980 | Scarpa et al. | |
| 4,368,597 A | 1/1983 | Fleckenstein | |
| 4,411,106 A | 10/1983 | Fleckenstein | |
| 4,578,906 A | 4/1986 | Appleton | |
| 4,727,685 A | 3/1988 | Batt | |
| 4,754,579 A | 7/1988 | Batt | |
| 4,858,390 A | 8/1989 | Kenig | |
| 5,031,362 A | 7/1991 | Reiling et al. | |
| 5,210,981 A | 5/1993 | Urda | |
| 5,235,784 A | 8/1993 | Oki et al. | |
| 5,293,156 A | 3/1994 | Shoji et al. | |
| 5,333,414 A | 8/1994 | Lee | |
| 5,785,950 A | 7/1998 | Kaufman et al. | |
| 6,916,235 B2 | 7/2005 | Mikiya et al. | |
| 7,306,047 B2 | 12/2007 | Oda et al. | |
| 7,364,498 B1 | 4/2008 | Snyder | |
| 7,410,007 B2 | 8/2008 | Chung et al. | |
| 8,051,920 B2 | 11/2011 | Tsai et al. | |
| 8,083,007 B2 | 12/2011 | Inagaki et al. | |
| 8,353,361 B2 | 1/2013 | Suzuki et al. | |
| 8,747,191 B2 | 6/2014 | Kishi et al. | |
| 9,114,514 B2 | 8/2015 | Leong et al. | |
| 9,156,120 B2 | 10/2015 | Kosonen et al. | |
| 9,505,119 B2 | 11/2016 | Chen | |
| 9,511,468 B2 | 12/2016 | Suzuki | |
| 9,561,548 B2 | 2/2017 | Kishima et al. | |
| 9,751,186 B2 | 9/2017 | Sperl et al. | |
| 10,137,554 B2 | 11/2018 | Hsu et al. | |
| 10,427,270 B2 | 10/2019 | Johnson et al. | |
| 10,618,139 B2 | 4/2020 | Sun | |
| 10,730,175 B2 | 8/2020 | Wolperding et al. | |
| 2007/0245871 A1* | 10/2007 | Li | B23D 59/002 83/478 |
| 2008/0074865 A1 | 3/2008 | Lutz et al. | |
| 2009/0114412 A1 | 5/2009 | Hatfield | |
| 2010/0181085 A1 | 7/2010 | Imada et al. | |
| 2012/0319509 A1 | 12/2012 | Kishima et al. | |
| 2018/0345443 A1 | 12/2018 | Ho | |
| 2019/0262965 A1 | 8/2019 | Geiger et al. | |
| 2020/0030936 A1 | 1/2020 | Knudson et al. | |
| 2020/0030938 A1 | 1/2020 | Knudson et al. | |
| 2020/0246959 A1 | 8/2020 | Wolperding et al. | |
| 2020/0353584 A1 | 11/2020 | Sun | |
| 2022/0324079 A1* | 10/2022 | Sitter | B24B 23/06 |
| 2022/0377217 A1* | 11/2022 | Dehghani | G02B 23/2423 |

FOREIGN PATENT DOCUMENTS

| | | | | |
|---|---|---|---|---|
| CN | 2912909 Y | 6/2007 | | |
| CN | 100503165 C | 6/2009 | | |
| CN | 102164709 A | 8/2011 | | |
| CN | 202742178 U | 2/2013 | | |
| CN | 203197712 U | 9/2013 | | |
| CN | 203197713 U | 9/2013 | | |
| CN | 203956681 U | 11/2014 | | |
| CN | 102699798 B | 1/2015 | | |
| CN | 204235334 U | 4/2015 | | |
| CN | 204913554 U | 12/2015 | | |
| CN | 103273406 B | 2/2016 | | |
| CN | 205290555 U | 6/2016 | | |
| CN | 107717686 A | 2/2018 | | |
| CN | 207840982 U | 9/2018 | | |
| CN | 209319496 U | 8/2019 | | |
| CN | 210173246 U | 3/2020 | | |
| CN | 210499673 U | 5/2020 | | |
| CN | 211305873 U | 8/2020 | | |
| CN | 211565466 U | 9/2020 | | |
| CN | 111941227 A | 11/2020 | | |
| CN | 212020351 U | 11/2020 | | |
| CN | 212553188 U | 2/2021 | | |
| DE | 202005004534 U1 | 5/2005 | | |
| DE | 102012205274 A1 | 10/2013 | | |
| DE | 102013202970 A1 | 8/2014 | | |
| DE | 102020006659 A1 | 5/2021 | * | B24B 1/02 |
| EP | 3533564 A1 | 9/2019 | | |
| EP | 3059049 B1 | 12/2019 | | |
| JP | 2021074874 A | 5/2021 | | |
| JP | 2021074875 A | 5/2021 | | |
| WO | 2008101556 A1 | 8/2008 | | |
| WO | 2014208589 A1 | 12/2014 | | |
| WO | 2017155108 A1 | 9/2017 | | |
| WO | 2020024095 A1 | 2/2020 | | |

OTHER PUBLICATIONS

European Patent Office Action for Application No. 23157871.7 dated Jan. 29, 2026 (7 pages).

* cited by examiner

FILE BELT SANDER

CROSS-REFERENCE TO RELATED APPLICATIONS

This application claims priority to U.S. Provisional Patent Application No. 63/312,444, filed on Feb. 22, 2022, the entire content of which is incorporated by reference herein.

FIELD OF THE INVENTION

The present invention relates to power tools, and in particular to portable file belt sanders.

BACKGROUND OF THE INVENTION

File belt sanders generally include an abrasive sanding belt that is driven in a continuous loop. Typically, there is a series of wheels that drive the sanding belt in a continuous loop, where the wheels are spaced apart to create lateral runs therebetween. At least one of the lateral runs or wheels can press the sanding belt against a workpiece to perform a sanding/filing operation.

SUMMARY OF THE INVENTION

The invention provides, in one aspect, a belt sander for sanding a workpiece including a main housing, a motor having a motor shaft disposed within the main housing, and a handle extending from the motor housing and configured to be grasped by a user for maneuvering the belt sander. The motor shaft defines a motor axis that is perpendicular to a handle axis of the handle. The belt sander further includes a battery that provides power to the motor and that is coupled to the handle along the handle axis. The belt sander further includes a contact arm that extends from the motor housing and is moveable between a stowed position, a deployed position, and a plurality of positions between the stowed position and the deployed position. The belt sander further includes a light assembly coupled to the motor housing. The light assembly includes a light housing rigidly coupled to the motor housing, an LED disposed within the light housing, and a lens coupled to the light housing for diverging light rays from the LED across a light range. When the contact arm is in the deployed position, the light range illuminates at least a portion of the contact arm and a space below the contact arm.

The invention provides, in yet another aspect, a belt sander for sanding a workpiece including a main housing, a motor having a motor shaft disposed within the main housing, and a handle extending from the motor housing and configured to be grasped by a user for maneuvering the belt sander. The motor shaft defines a motor axis that is perpendicular to a handle axis of the handle. The belt sander further includes a battery that provides power to the motor and that is coupled to the handle along the handle axis. The belt sander further includes a contact arm that extends from the motor housing and is moveable between a stowed position, a deployed position, and a plurality of positions between the stowed position and the deployed position. The contact arm includes a wheel housing coupled to the motor housing, a drive wheel disposed within the wheel housing, and a driven wheel driven by the drive wheel via an abrasive belt. The belt sander further includes a guard cover pivotably coupled relative to the wheel housing to selectively enclose the drive wheel within the wheel housing.

The invention provides, in another aspect, a belt sander for sanding a workpiece including a main housing, a motor having a motor shaft disposed within the main housing, and a handle extending from the motor housing and configured to be grasped by a user for maneuvering the belt sander. The motor shaft defines a motor axis that is perpendicular to a handle axis of the handle. The belt sander further includes a battery that provides power to the motor and that is coupled to the handle along the handle axis. The belt sander further includes a contact arm that extends from the motor housing and is moveable between a stowed position, a deployed position, and a plurality of positions between the stowed position and the deployed position. The belt sander further includes a sensor disposed on the motor housing configured to sense a position of the contact arm and a controller disposed within the motor housing configured to receive signals from the sensor and control the motor in response to the contact arm being in a predetermined position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
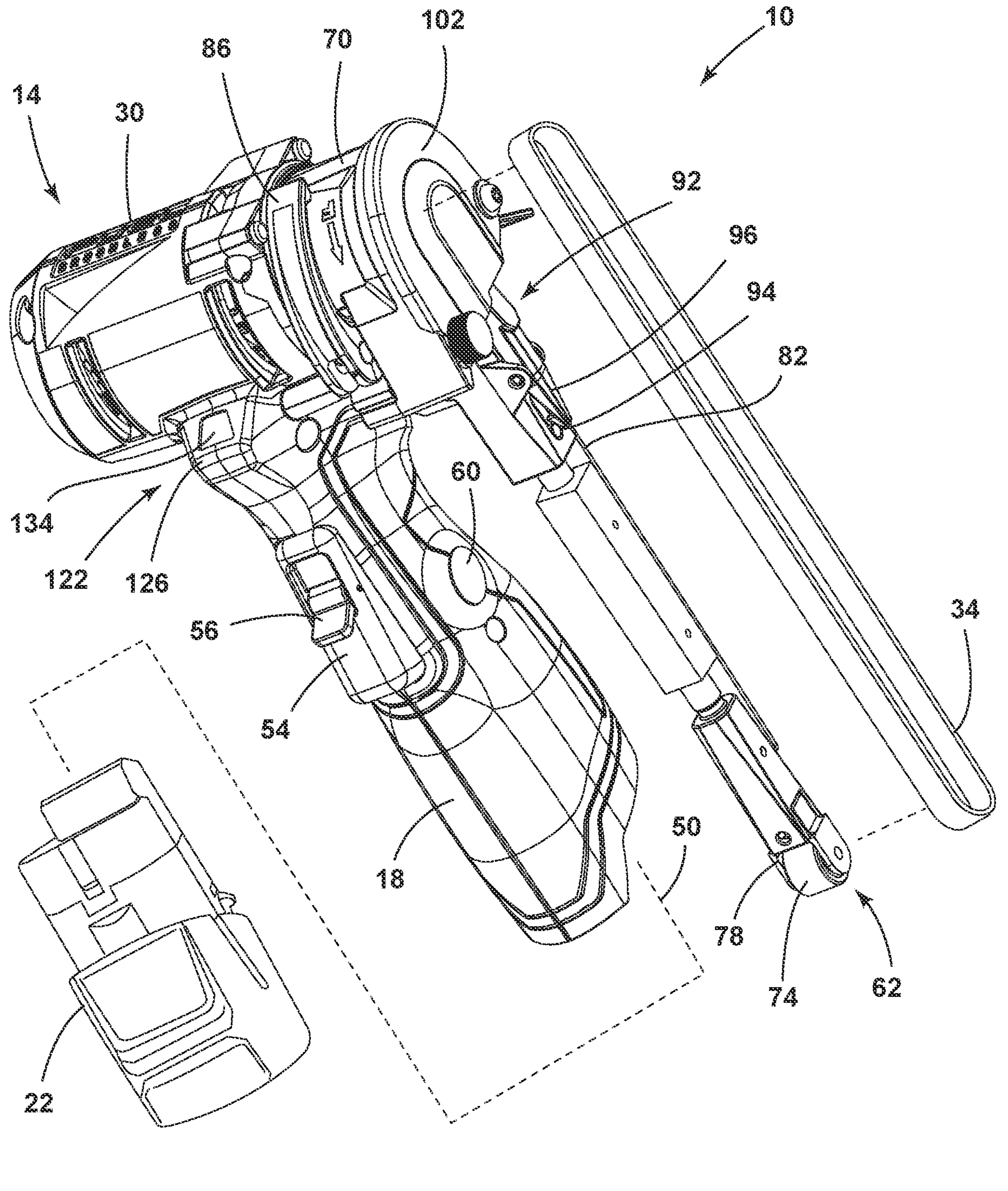
FIG. 1 is a perspective view of a file belt sander according to an embodiment of the invention, illustrating a contact arm in a stowed position.

FIG. 1 illustrates a portable power tool, such as a file belt sander 10 (referred to hereinafter as sander 10), for sanding a workpiece. In the illustrated embodiment, the sander 10 includes a main housing 14, a handle 18 used for handling and maneuvering the sander 10 relative to a workpiece, and a battery pack 22 for providing electrical power to the sander 10. The main housing 14 is comprised of a plurality of sub-housings (e.g., two clamshell halves, unibody housings, etc.) that are connected with threaded fasteners (e.g., screws).

Figure 2:
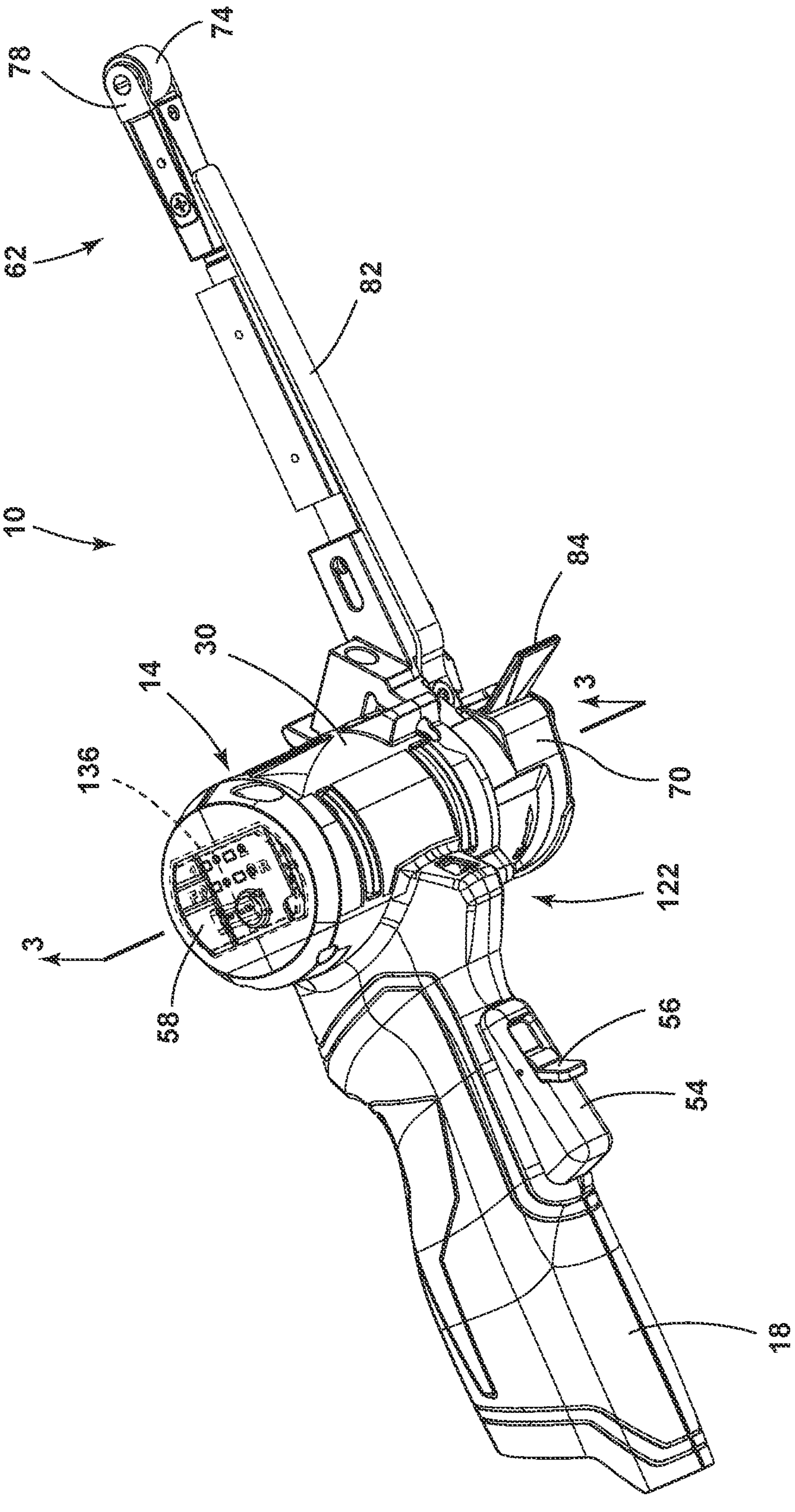
FIG. 2 is another perspective view of the file belt sander of FIG. 1, illustrating the contact arm in a deployed position.
Figure 3:
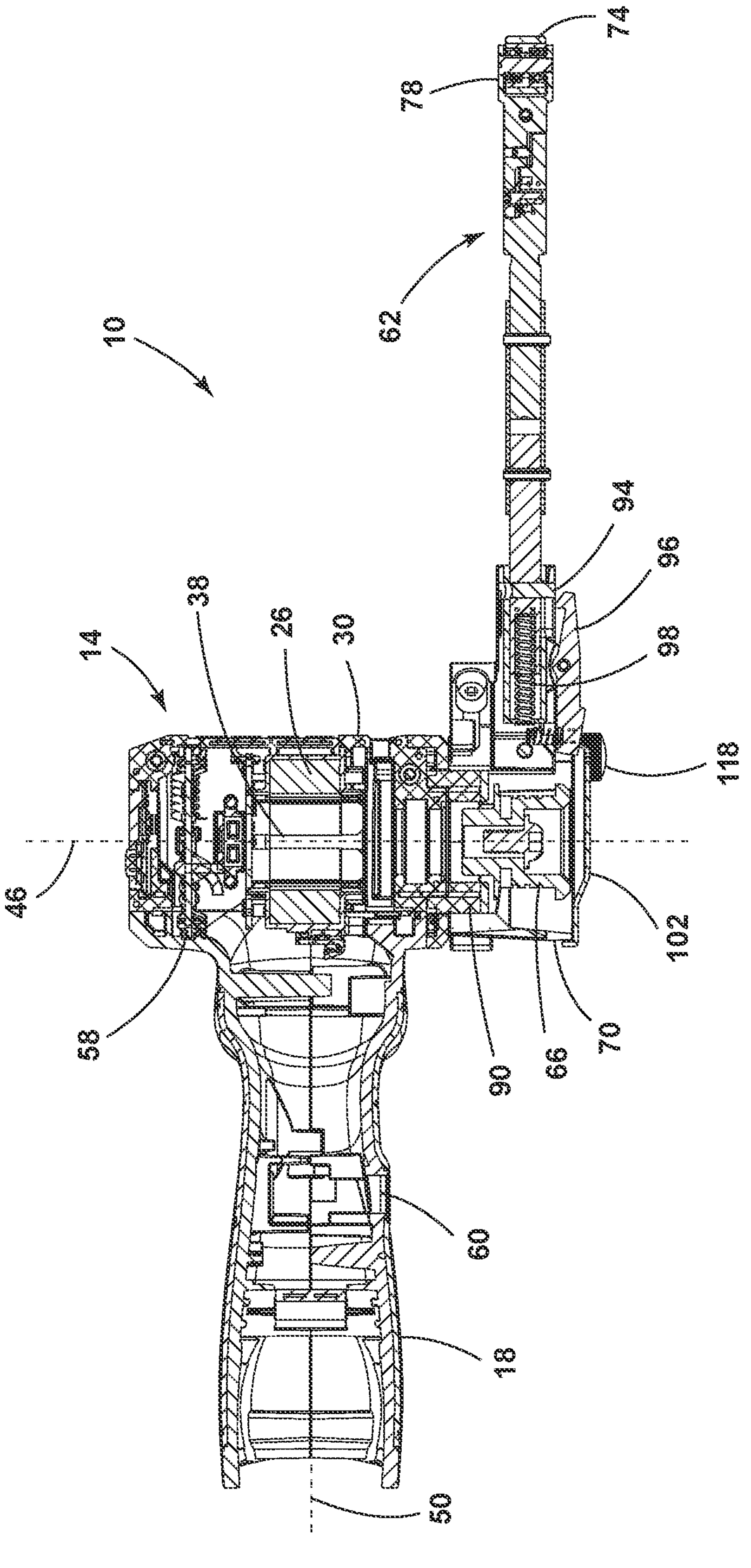
FIG. 3 is a cross-sectional view of the file belt sander taken along line 3-3 of FIG. 2.

With reference to FIGS. 1-3, the sander 10 further includes a motor 26 that is positioned within a motor housing 30 and operable to drive an abrasive belt 34 (FIG. 1). The motor 26 is an electric motor—more specifically, a brushless direct current (DC) electric motor—capable of producing a rotational output through a drive shaft 38 (FIG. 3) which, in turn, provides a rotational input to drive the abrasive belt 34. The motor 26 defines a motor axis 46 about which the drive shaft 38 rotates when the motor 26 is activated. In the illustrated embodiment, the motor axis 46 is perpendicular to a handle axis 50. The battery pack 22 connects to the handle 18 along the handle axis 50 and provides electrical power to the motor 26 when a trigger 54 (FIG. 2) is depressed. Specifically, an electronic controller 58 (e.g., a PCB, etc.; FIG. 3) is disposed within the motor housing 30 and transmits electrical current to the motor 26 in response to a user actuating the trigger 54. The trigger 54 is conveniently positioned on the handle 18 to allow a user to maneuver and activate the sander 10 with a single hand. A lock-off mechanism 56 (FIG. 2) inhibits inadvertent actuation of the trigger 54, whereas a lock-on mechanism 60 (FIG. 3) enables a user to maintain activation of the trigger 54 without constantly depressing the trigger 54.

Figure 4:
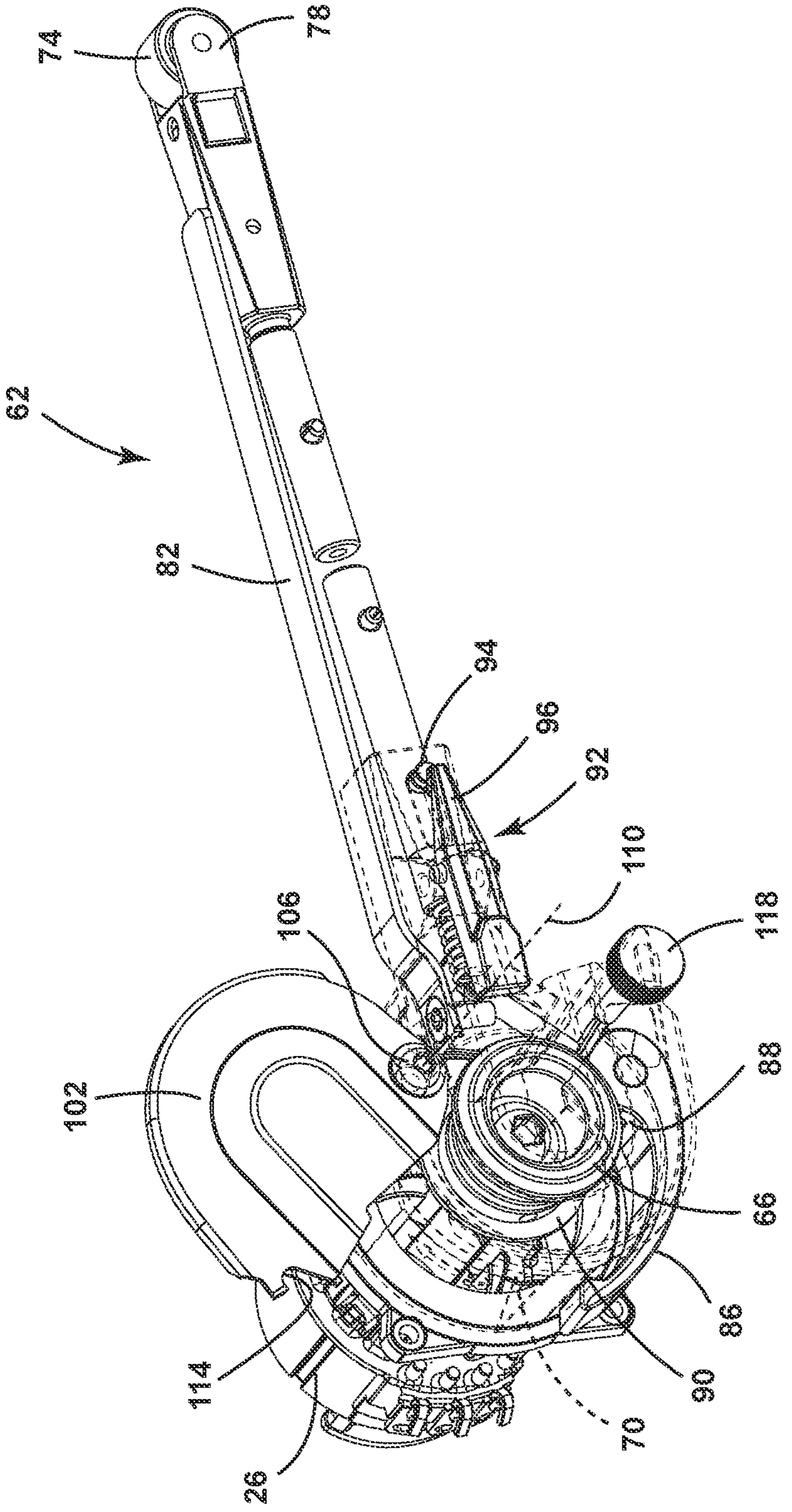
FIG. 4 is a perspective view of a contact arm of the file belt sander, illustrating a lever clamp in a locked position.
Figure 5:
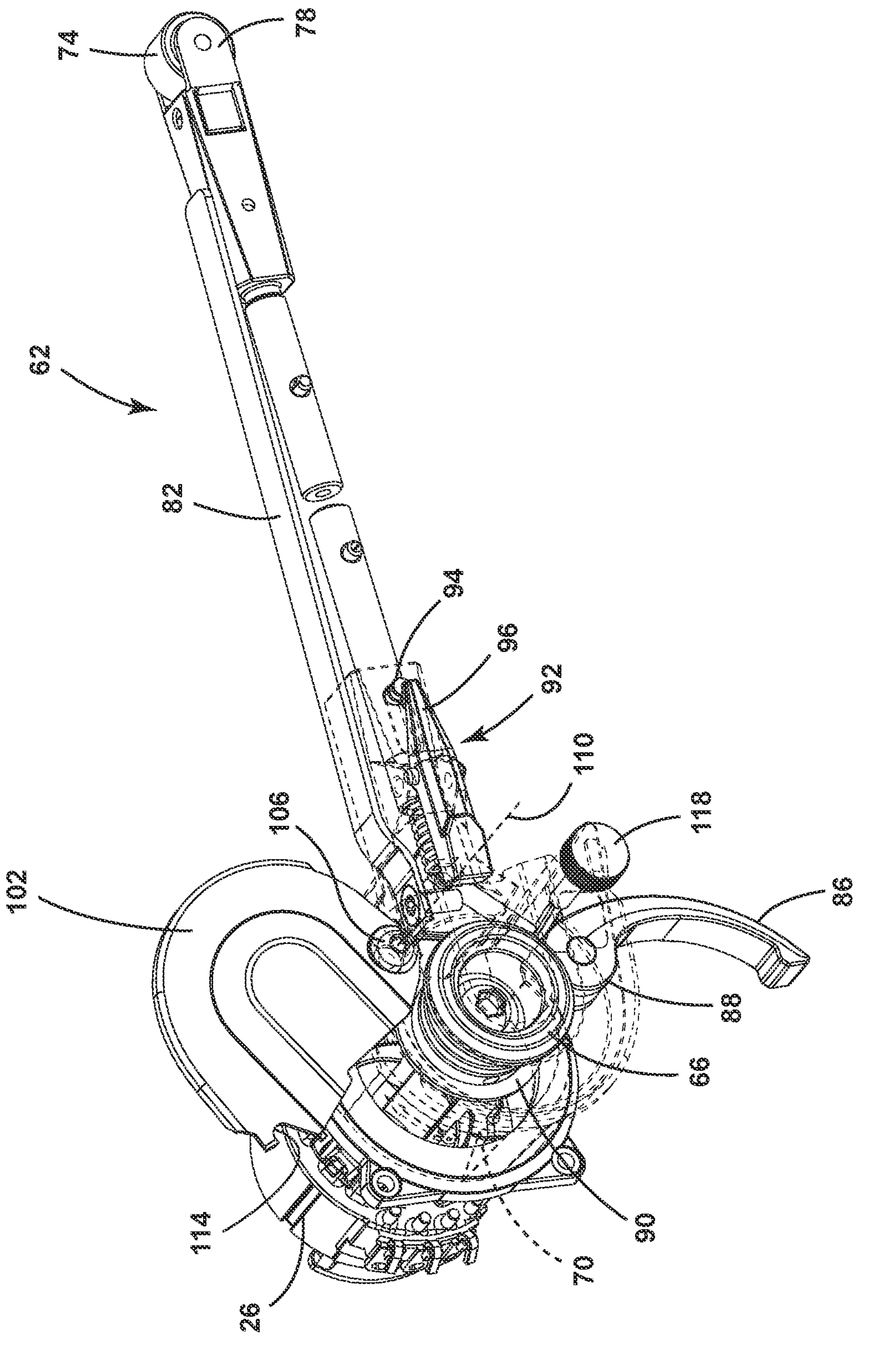
FIG. 5 is a perspective view of the contact arm of the file belt sander, illustrating the lever clamp in an unlocked position.

With reference to FIGS. 3-5, the sander 10 further includes a contact arm 62 that extends from the motor housing 30 and is configured to guide the abrasive belt 34 when the motor 26 is activated. The motor 26 is disposed between the contact arm 62 and the controller 58 in a direction along the motor axis 46. A drive wheel 66 is disposed within a wheel housing 70 of the contact arm 62 and there is a driven wheel 74 disposed at a distal end 78 of the contact arm 62. The drive wheel 66 is coupled to and driven directly from the drive shaft 38 of the motor 26. As such, the motor 26 directly drives the drive wheel 66 such that the drive shaft 38 and the drive wheel 66 rotate at the same angular velocity. In some embodiments, the drive wheel 66 may also include a chamfered edge to facilitate installation of the abrasive belt 34 on the drive wheel 66. The driven wheel 74 is driven by the drive wheel 66 via the abrasive belt 34. In the illustrated embodiment, the contact arm 62 further includes a platen 82 that generally extends along the length of the contact arm 62 and provides a support surface to press the abrasive belt 34 against a workpiece. Although the platen 82 of the illustrated embodiment is disposed on one side of the contact arm 62, in other embodiments, another platen may be disposed on the other side of the contact arm 62. The contact arm 62 is adjustable between different orientations relative to the handle 18 to facilitate access of the sander 10 into awkward or tight spaces. Specifically, the wheel housing 70 of the contact arm 62 is rotationally supported on the motor housing 30, such that the contact arm 62 is pivotable about the motor axis 46 to varied positions, such as a stowed position (FIG. 1), a deployed position (FIG. 2), and any position therebetween.

The sander 10 further includes a debris guard 84 (FIG. 2) that extends away from the wheel housing 70 and is disposed between the handle 18 and the contact arm 62. In the illustrated embodiment, the debris guard 84 is flexible and composed of an elastomeric material. In other embodiments, the debris guard 84 may be rigid and composed of a different material, such as plastic or other similar material. The debris guard 84 includes an enlarged head that is slidably received along a direction parallel to the motor axis 46 within a corresponding slot in the wheel housing 70. As such, the debris guard 84 is removably coupled to the wheel housing 70. The debris guard 70 is aligned with the contact arm 62 and the abrasive belt 34. This enables the debris guard 84 to block debris and shaved material from inadvertently contacting a user's hand as debris and shaved material is removed from a workpiece via the abrasive belt 34.

With continued reference to FIGS. 3-5, a lever clamp 86 is disposed on the wheel housing 70 and configured to selectively deform the wheel housing 70 (via a cam 88) in order to apply a clamping force on an arm hub 90 of the motor housing 30 so the contact arm 62 remains in a desired position (e.g., stowed position, deployed position, etc.). The lever clamp 86 moves between a locked position (FIG. 4) and unlocked position (FIG. 5). In the locked position, a large-radius section of the cam 88 presses against and effectively reduces the diameter of the wheel housing 70, such that the contact arm 62 is inhibited from inadvertent movement relative to the motor housing 30. In the unlocked position, a small-radius section is pressed against the wheel housing 70, permitting it to rebound to its undeformed shape, and permitting the contact arm 62 to rotate relative to the motor housing 30. The lever clamp 86 may be moved between the locked position and the unlocked position without the use of a tool. In other embodiments, the lever clamp 86 may be different types of quick-release mechanisms (e.g., over-center latch, buckle, etc.)

Figure 8:
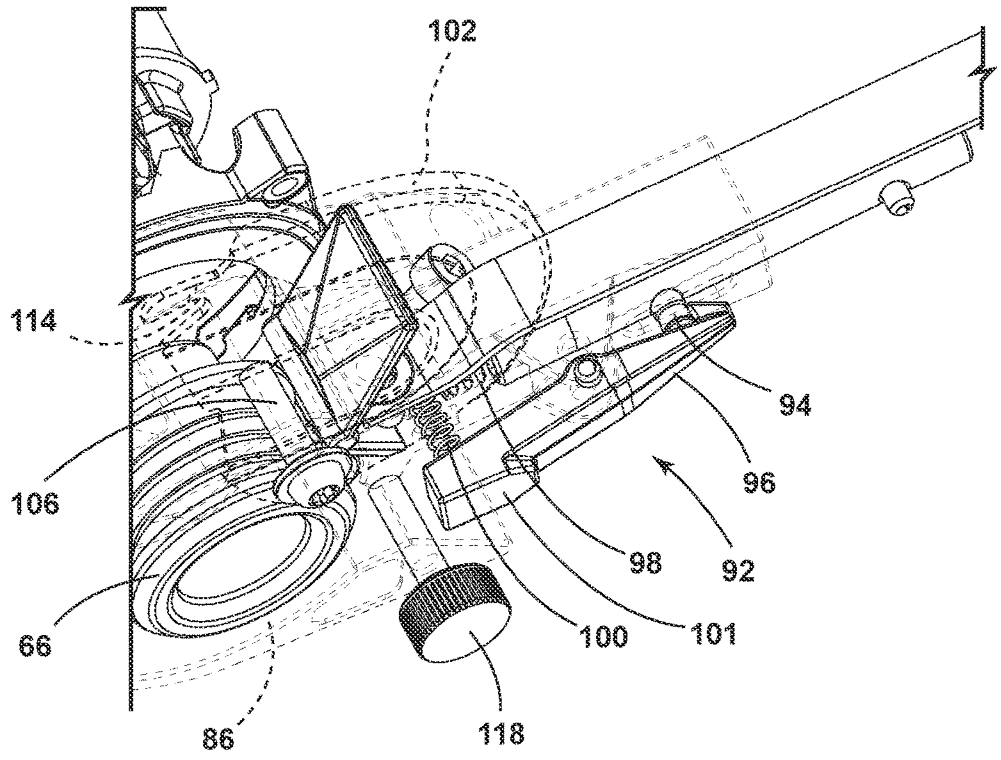
FIG. 8 is an enlarged perspective view of a belt change mechanism of the file belt sander of FIG. 1.

With continued reference to FIGS. 3-5, the sander 10 further includes a belt change mechanism 92 having a pin 94 and an latch 96 that selectively engages the pin 94. The belt change mechanism 92 facilitates installing and removing the abrasive belt 34 from the contact arm 62 without the use of hand tools. Specifically, the belt change mechanism 92 allows the contact arm 62 to move between an extended position (FIG. 5) and a retracted position (FIG. 8). In the extended position, the abrasive belt 34 is in a taut state around the drive wheel 66 and the driven wheel 74, thereby inhibiting removal of the abrasive belt 34 from the contact arm 62. In the retracted position, the abrasive belt 34 is in a loose state around the drive wheel 66 and the driven wheel 74, thereby permitting removal of the abrasive belt 34 from the contact arm 62. When the sander 10 is not in use, an external force may be exerted on the distal end 78 of the contact arm 62 against the bias of a contact arm spring 98 to decrease the length of the contact arm 62, moving the contact arm 62 toward the retracted position. At this point, a portion of the contact arm 62 slides into the wheel housing 70, where the pin 94 slides past a hook 99 of the latch 96, thereby pivoting the latch 96 against the bias of a latch spring 100 (FIG. 8). The hook 99 catches the pin 94 and maintains the contact arm 62 in the retracted position until a user depresses an opposite end 101 of the latch 96, at which point the contact arm spring 98 urges the contact arm 62 toward the extended position. The actuator 96 acts as a pivoting lever with the hook 99 at one end, the opposite end 101 at the other end, and a pivot disposed therebetween. The opposite end 101 is in contact with the latch spring 100. The contact arm 62 can be moved between the extended position and the retracted position when the contact arm 62 is rotated to any position (e.g., stowed position, deployed position, and any position therebetween).

With reference to FIGS. 4 and 5, the sander 10 further includes a guard cover 102 that is coupled to the wheel housing 70 and configured to selectively cover the drive wheel 66. The guard cover 102 is pivotably coupled to the wheel housing 70 about a pin (e.g., rivet, etc.) or a threaded fastener 106 between a closed state (FIG. 1) and an open state (FIG. 4). The threaded fastener 106 defines a pivot axis

110 about which the guard cover 102 pivots. The pivot axis 110 is parallel to the motor axis 46. In the closed state, the guard cover 102 substantially encloses the drive wheel 66 in the wheel housing 70, thereby inhibiting access to the drive wheel 66. Also, a recess 114 in the guard cover 102 receives a threaded knob 118 that is threaded into the wheel housing 70 when the guard cover 102 is in the closed state. The threaded knob 114 may be rotated (i.e., tightened) to maintain the guard cover in the closed state. In the open state, the guard cover 102 substantially opens the wheel housing 70, thereby enabling access to the drive wheel 66. To change the abrasive belt 34, the contact arm 62 should be in the retracted position and the guard cover 102 should be in the open state, allowing the abrasive belt 34 to be removed from the drive wheel 66 and the driven wheel 74.

Figure 6:
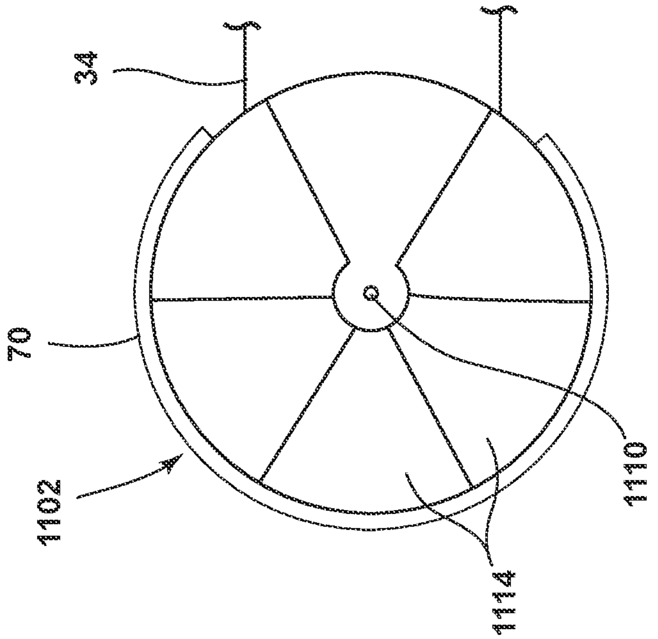
FIG. 6 is a plan view of a guard cover of the file belt sander in accordance with another embodiment, illustrating the guard cover in a closed state.
Figure 7:
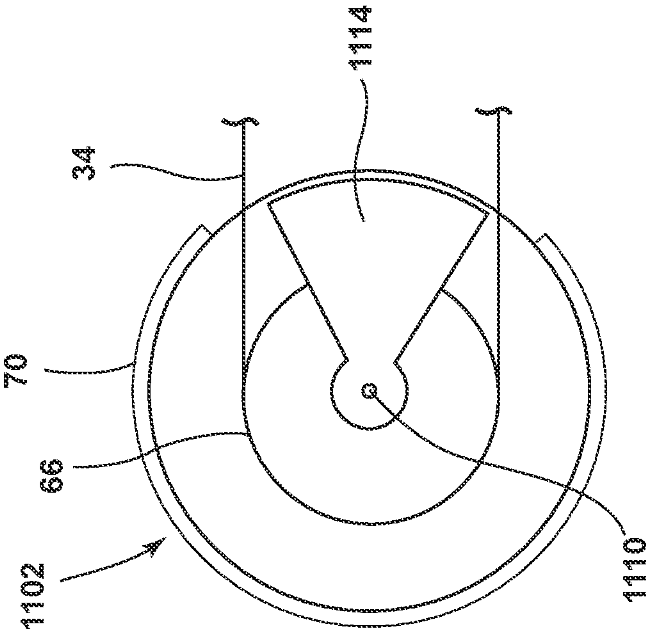
FIG. 7 is a plan view of the guard cover of FIG. 6 in an open state.

In other embodiments, the sander 10 may instead include a guard cover 1102, as shown in FIGS. 6 and 7. The guard cover 1102 is coupled to the wheel housing 70 and configured to selectively cover the drive wheel 66. The guard cover 1102 is pivotably coupled to the wheel housing 70 between a closed state (FIG. 6) and an open state (FIG. 7). The guard cover 1102 pivots about a pivot axis 1110 that is coaxial with the motor axis 46. The guard cover 1102 includes a plurality of arcuate members 1114 that are all individually pivotable about the pivot axis 1110. In the closed state, the plurality of arcuate members 1114 of the guard cover 1102 are spread out and substantially enclose the drive wheel 66 in the wheel housing 70, thereby inhibiting access to the drive wheel 66. In the open state, each arcuate member 1114 sequentially pivots behind (i.e., tucks behind) the adjacent arcuate member 1114 until all the arcuate members 1114 lie within the footprint of one of the arcuate members 1114. In total, the plurality of arcuate members 1114 form a 360-degree circle when spread or fanned out in the open state. In the illustrated embodiment, there are a total of six arcuate members 1114 that each account for 60-degrees of the 360-degree circle. In other embodiments, there may be fewer or greater than six arcuate members 1114.

Figure 9:
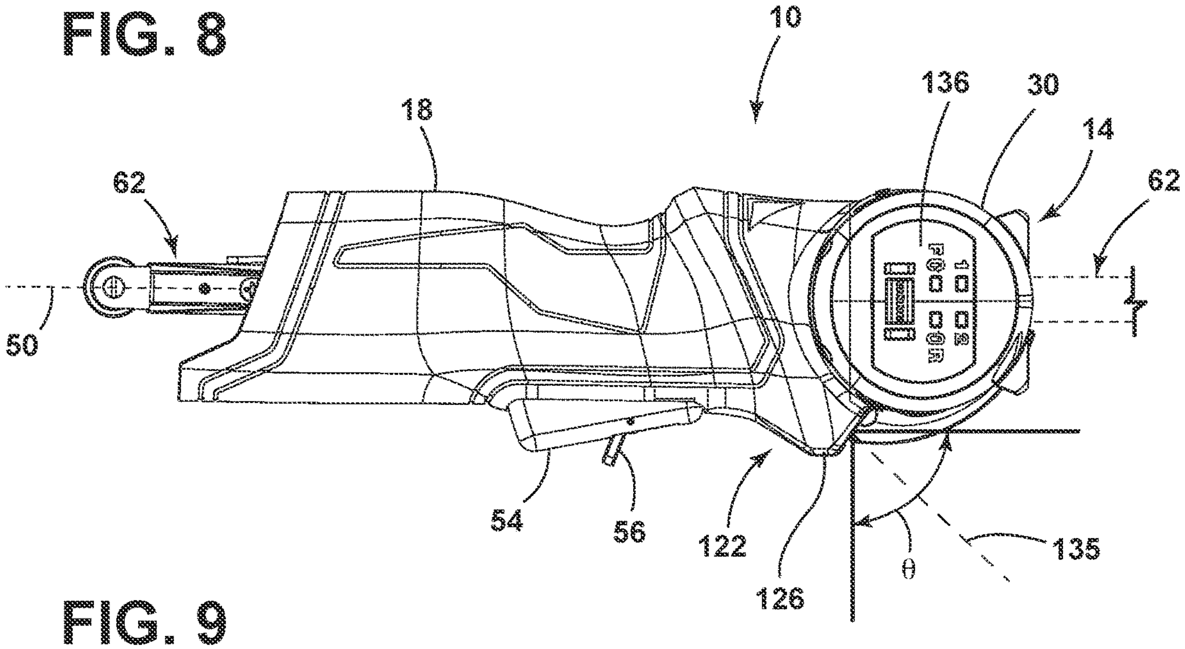
FIG. 9 is a side plan view of the file belt sander of FIG. 1, illustrating a light range of a light assembly.
Figure 10:
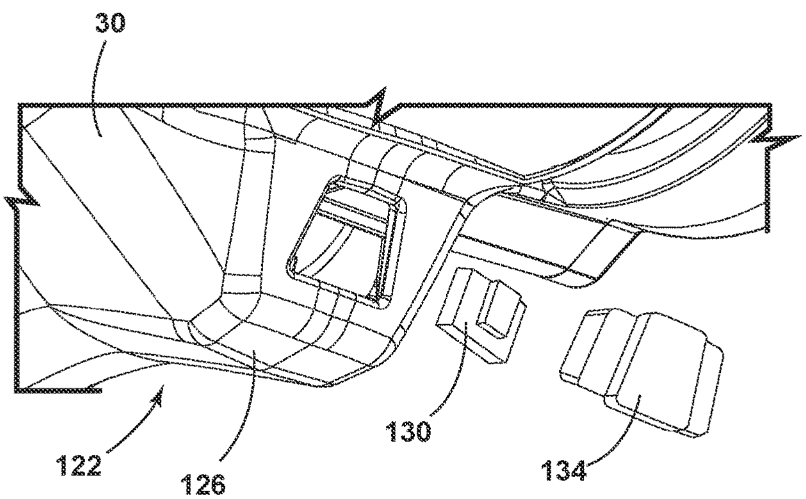
FIG. 10 is an enlarged exploded view of the light assembly of FIG. 9, illustrating a light housing, an LED, and a lens.

With reference to FIGS. 9 and 10, the sander 10 further includes a light assembly 122 coupled to the main housing 14 and is configured to illuminate a workpiece. The light assembly 122 is positioned on the underneath side of the motor housing 30 adjacent the trigger 54. As shown in FIG. 10, the light assembly 122 includes a light housing 126 extending away from the motor housing 30, a light-emitting diode (LED) 130 disposed within the light housing 126, and a lens 134 coupled to the light housing 126. The light housing 126 is rigidly coupled to the motor housing 30. That is, the light assembly 122—and therefore the light housing 126, the LED 130, and the lens 134—is incapable of moving relative to the motor housing 30 to avoid inadvertent movement of the light assembly 122 during operation. The lens 134 is a diverging lens, such that the lens 134 disperses (i.e., diverges) light rays from the LED 130 across a light range θ (FIG. 9). In some embodiments, the light range θ is approximately 120 degrees. More specifically, the light range θ is approximately 90 degrees. When the contact arm 62 is in the deployed position (as depicted in phantom lines of FIG. 9), the light range θ is oriented to illuminate the contact arm 62 and approximately 90 degrees of space below the contact arm 62. A light axis 135 extends in a direction perpendicular to the LED 130 and is orientated at an angle approximately 45 degrees relative to the contact arm 62 in the deployed position. In other words, the light axis 135 is oriented at an angle approximately 135 degrees relative to the handle axis 50. The angle between the light axis 135 and the handle axis 50 is fixed. The light assembly 122 may be activated, for example, when the trigger 54 is depressed.

With reference to FIG. 9, the sander 10 further includes a user interface 136 (e.g., membrane switch, etc.) disposed on the side of the motor housing 30. Specifically, the user interface 136 is disposed at least partially on the exterior of the motor housing 30, and is situated adjacent and parallel to the controller 58 (FIG. 3). The user interface 136 has various speed and direction controls (i.e., low, high, forward, reverse, mode selection, etc.), which can control the motor 26 based on user input.

Figure 11:
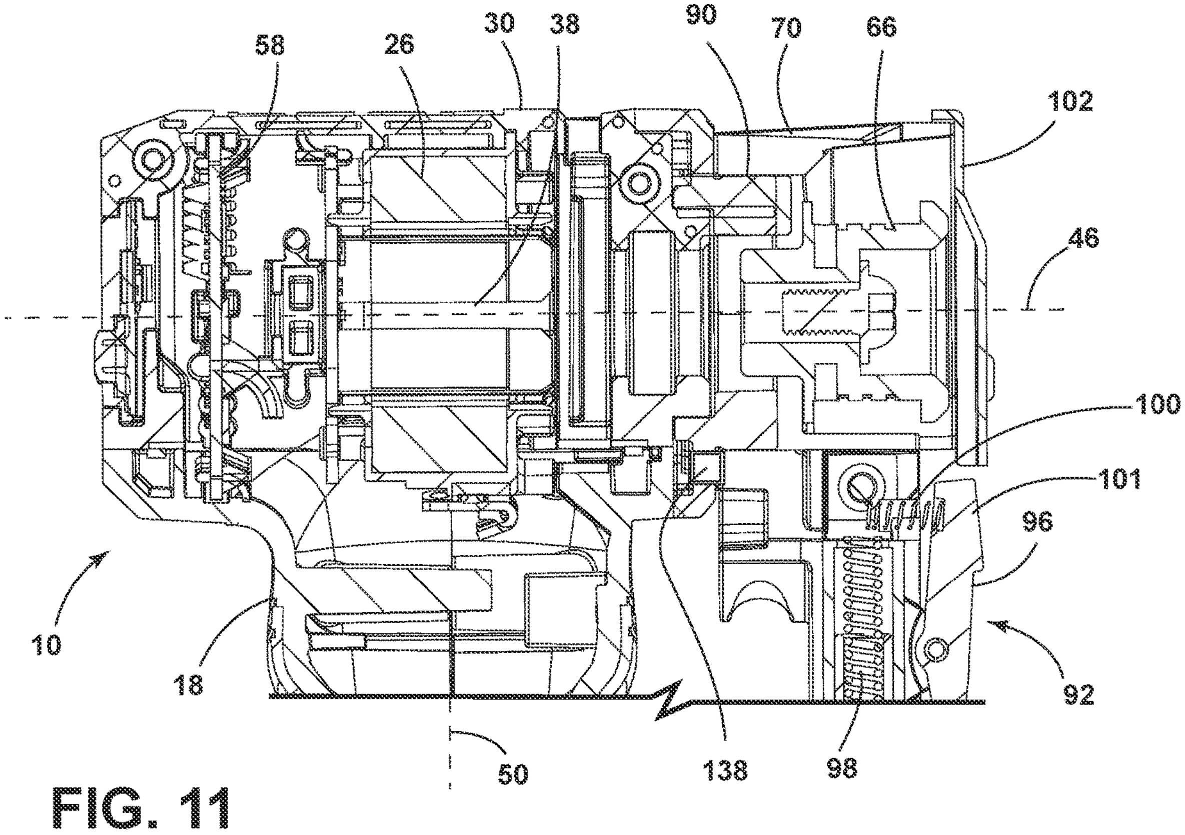
FIG. 11 is an enlarged view of FIG. 3, illustrating a sensor embedded within a motor housing.

With reference to FIG. 11, the sander 10 further includes a sensor 138 that is disposed within the arm hub 90 of the motor housing 30. The sensor 138 is configured to detect the position of the contact arm 62 relative to the handle 18. The sensor 138 may be a microswitch, a limit switch, a Hall-effect sensor, a proximity sensor, an induction sensor, or other similar type of sensor. Although the sensor 138 of the illustrated embodiment is disposed on the arm hub 90 adjacent the handle 18, in other embodiments, the sensor 138 may alternatively be disposed elsewhere on the arm hub 90. Also, there may be multiple sensors disposed at various locations around the arm hub 90. The sensor 138 may be activated in response to the contact arm 62 reaching a certain position. For example, the sensor 138 may be activated when the contact arm 62 reaches the stowed position, the deployed position, or any other position therebetween, depending on the application. When the sensor 138 is activated, the sensor 138 sends a signal to the controller 58, which controls the motor 26 accordingly. In one exemplary scenario, the controller 58 may deactivate the motor 26 when the contact arm 62 activates the sensor 138 when moving to the stowed position. In another exemplary scenario, the controller 58 may activate a series of visual indicators (e.g., LEDs, etc.) when the contact arm 62 activates the sensor 138 when moving to the deployed position. The LEDs may visually indicate to a user that the sander 10 is safe to use.

In operation of the sander 10, an operator depresses the trigger 54 after moving the lock-off mechanism 56 to activate the motor 26, which continuously drives the drive wheel 66 through the drive shaft 38. The drive wheel 66 transfers rotational movement to the driven wheel 74 via the abrasive belt 34. As the abrasive belt 34 is driven around the wheels 66, 74, the abrasive belt 34 also slides along the platen 82, providing a support surface for the abrasive belt 34. As such, various areas of the contact arm 62, such as the wheels 66, 76 or the platen 82 can press the abrasive belt 34 against a workpiece. When the trigger 54 is depressed, a user may actuate the lock-on mechanism 60 to maintain activation of the trigger 54. The LED 130 may illuminate in response to activation of the trigger 54.

To change out the abrasive belt 34, a user simply moves the guard cover 102, 1102 to the open state and applies a compressive force to the distal end 78 of the contact arm 62 to move the contact arm 62 to the retracted position. At this time, the hook 99 of the latch 96 catches the pin 94 to hold the contact arm 62 in the retracted position. Now, the abrasive belt 34 is in the loose configuration, where the abrasive belt 34 can be removed from around the contact arm 62 and replaced with a new abrasive belt. Subsequently, a user simply presses the opposite end 101 of the latch 96 against the bias of the latch spring 100 to release the contact arm 62 to the extended position under the bias of the contact arm spring 98, where the abrasive belt 34 is in the taut configuration.

The abrasive belt 34 may be changed when the contact arm 62 is in any position. However, it is preferable to change the abrasive belt 34 when the contact arm 62 is in the stowed position because the sensor 138 will sense that the contact arm 62 is in the stowed position and inhibit inadvertent activation of the motor 26 if the trigger 54 is accidentally depressed. The sensor 138 may also sense when the contact arm 62 is moved away from the stowed position, where the controller 58 may activate the series of visual indicators to indicate to a user that the sander 10 is ready to use.

Although the invention has been described in detail with reference to certain preferred embodiments, variations and modifications exist within the scope and spirit of one or more independent aspects of the invention as described.

Various features of the invention are set forth in the following claims.

The invention claimed is:

1. A belt sander for sanding a workpiece comprising:
- a main housing;
- a motor disposed within a motor housing and having a drive shaft;
- a handle extending from the motor housing and configured to be grasped by a user for maneuvering the belt sander, the drive shaft defines a motor axis that is perpendicular to a handle axis of the handle;
- a battery providing power to the motor and coupled to the handle along the handle axis;
- a contact arm extending from the motor housing and being moveable between a stowed position, a deployed position, and a plurality of positions between the stowed position and the deployed position, the contact arm including
  - a wheel housing coupled to the motor housing,
  - a drive wheel disposed within the wheel housing, and
  - a driven wheel driven by the drive wheel via an abrasive belt;
- a guard cover pivotably coupled relative to the wheel housing to selectively enclose the drive wheel within the wheel housing; and
- a controller that is disposed within the motor housing and oriented perpendicular to the motor axis.

2. The belt sander of claim 1, further comprising
- a light assembly coupled to the motor housing, the light assembly including
  - a light housing rigidly coupled to the motor housing,
  - an LED disposed within the light housing, and
  - a lens coupled to the light housing for diverging light rays from the LED across a light range,
- wherein when the contact arm is in the deployed position, the light range illuminates at least a portion of the contact arm and a space below the contact arm.

3. The belt sander of claim 2, wherein the light range is 120-degrees.

4. The belt sander of claim 2, wherein the light range is 90-degrees.

5. The belt sander of claim 2, wherein the lens is a diverging lens.

6. The belt sander of claim 2, further comprising a light axis that is perpendicular to the LED and is oriented at an angle of 45-degrees relative to the contact arm in the deployed position.

7. The belt sander of claim 6, wherein the light axis is oriented at an angle of 135-degrees relative to the handle axis, and wherein the angle between the light axis and the handle axis is fixed.

8. The belt sander of claim 1, wherein the guard cover pivots between a closed state, in which a user is inhibited from accessing the drive wheel, and an open state, in which a user is permitted to access the drive wheel.

9. The belt sander of claim 8, wherein when the guard cover is in the closed state, a recess of the guard cover receives a threaded fastener, wherein the threaded fastener is tightened to exert a clamping force on the guard cover to maintain the guard cover in the closed state.

10. The belt sander of claim 9, wherein the threaded fastener is loosened in order to pivot the guard cover away from the closed state toward the open state, thereby removing the engagement between the recess and the threaded fastener.

11. The belt sander of claim 9, wherein the guard cover is pivotably coupled relative to the wheel housing about a pivot axis that is coaxial to the motor axis.

12. The belt sander of claim 11, wherein the guard cover includes a plurality of arcuate segments that pivot relative to each other.

13. The belt sander of claim 12, wherein one of the arcuate segments pivots behind an adjacent arcuate segment when the guard cover is moving to the open state.

14. The belt sander of claim 12, wherein when the guard cover is in the open state, the plurality of arcuate segments lie within the same footprint of one of the arcuate segments.

15. The belt sander of claim 1, wherein the guard cover is pivotably coupled to the wheel housing about a pivot axis that is parallel to the motor axis.

16. The belt sander of claim 1, wherein the motor directly drives the drive wheel, such that the drive shaft and the drive wheel rotate at the same angular velocity.

17. The belt sander of claim 1, wherein the motor is a DC brushless motor.

18. The belt sander of claim 1, further comprising a user interface for controlling speed and direction of the motor, wherein the user interface is disposed on the motor housing opposite the contact arm and is oriented parallel to the controller.

19. The belt sander of claim 18, wherein the user interface is disposed on the exterior of the motor housing and the controller is disposed on the interior of the motor housing.

20. The belt sander of claim 7, wherein the motor is disposed between the controller and the drive wheel in a direction along the motor axis.

21. A belt sander for sanding a workpiece comprising:
- a main housing;
- a motor disposed within a motor housing and having a drive shaft;
- a handle extending from the motor housing and configured to be grasped by a user for maneuvering the belt sander, the drive shaft defines a motor axis that is perpendicular to a handle axis of the handle;
- a battery providing power to the motor and coupled to the handle along the handle axis;
- a contact arm extending from the motor housing and being moveable between a stowed position, a deployed position, and a plurality of positions between the stowed position and the deployed position, the contact arm including
  - a wheel housing coupled to the motor housing,
  - a drive wheel disposed within the wheel housing, and
  - a driven wheel driven by the drive wheel via an abrasive belt; and
- a guard cover pivotably coupled relative to the wheel housing about a pivot axis that is coaxial to the motor axis to selectively enclose the drive wheel within the wheel housing, the guard cover pivots between a closed state, in which a user is inhibited from accessing the drive wheel, and an open state, in which a user is permitted to access the drive wheel, the guard cover includes a plurality of arcuate segments that pivot relative to each other, wherein when the guard cover is in the closed state, a recess of the guard cover receives a threaded fastener, wherein the threaded fastener is tightened to exert a clamping force on the guard cover to maintain the guard cover in the closed state.

22. A belt sander for sanding a workpiece comprising:

a main housing;

a motor disposed within a motor housing and having a drive shaft;

a handle extending from the motor housing and configured to be grasped by a user for maneuvering the belt sander, the drive shaft defines a motor axis that is perpendicular to a handle axis of the handle;

a battery providing power to the motor and coupled to the handle along the handle axis;

a contact arm extending from the motor housing and being moveable between a stowed position, a deployed position, and a plurality of positions between the stowed position and the deployed position, the contact arm including a wheel housing coupled to the motor housing, a drive wheel disposed within the wheel housing, and a driven wheel driven by the drive wheel via an abrasive belt;

a guard cover pivotably coupled relative to the wheel housing to selectively enclose the drive wheel within the wheel housing; and a user interface for controlling speed and direction of the motor, the user interface is disposed on the motor housing opposite the contact arm.

* * * * *